United States Patent
Røthe et al.

(10) Patent No.: US 9,382,102 B2
(45) Date of Patent: Jul. 5, 2016

(54) ESCALATOR HANDRAIL PURIFIER APPARATUS

(71) Applicant: TECNOVAP AS, Moss (NO)

(72) Inventors: Svein Røthe, Råde (NO); Hans Åge Bergfald, Moss (NO); Thomas Tjelland, Moss (NO)

(73) Assignee: TECNOVAP AS, Moss (NO)

( * ) Notice: Subject to any disclaimer, the term of this patent is extended or adjusted under 35 U.S.C. 154(b) by 0 days.

(21) Appl. No.: 14/386,376

(22) PCT Filed: Mar. 20, 2013

(86) PCT No.: PCT/NO2013/050057
§ 371 (c)(1),
(2) Date: Sep. 19, 2014

(87) PCT Pub. No.: WO2013/141713
PCT Pub. Date: Sep. 26, 2013

(65) Prior Publication Data
US 2015/0047949 A1   Feb. 19, 2015

(30) Foreign Application Priority Data
Mar. 21, 2012 (NO) .................................. 20120333

(51) Int. Cl.
*B65G 45/22* (2006.01)
*B66B 31/02* (2006.01)

(52) U.S. Cl.
CPC ............... *B66B 31/02* (2013.01); *B65G 45/22* (2013.01)

(58) Field of Classification Search
CPC ........ B66B 31/02; B65G 45/18; B65G 45/22; B65G 45/24; B65G 45/26

USPC .................................. 198/321–338, 494–499
See application file for complete search history.

(56) References Cited

U.S. PATENT DOCUMENTS 3,910,400 A * 10/1975 Hishitani .................. B08B 1/02
  198/338
3,941,241 A * 3/1976 Hishitani ................ B66B 31/02
  198/338

(Continued)

FOREIGN PATENT DOCUMENTS

JP       3-12875 U    2/1991
KR   10-2006-0031200 A   4/2006

(Continued)

*Primary Examiner* — William R Harp
(74) *Attorney, Agent, or Firm* — Birch, Stewart, Kolasch & Birch, LLP (57) ABSTRACT

The invention is an escalator handrail cleaning apparatus for a running handrail (1) on a guide rail (11) along an escalator (12), wherein the cleaning apparatus comprises: —a main body (3) with a preferably underlying, generally through channel (31) for the handrail (1) to pass through, —a steam supply hose (2) to a longitudinally running inlet channel (21) in the main body (3) and connected to one or more across distribution channels (5) in the main body (3), —a number of steam nozzles (6) from the distribution channel (5) directed towards the through passing handrail (1), —at least a first and a second squeegee gasket (7) for delimiting a space (38) in the through channel (31) between the main body (3), the through running handrail (1), and the surroundings and arranged for wiping off water and dirt from the through running handrail (1), —at least one drain channel (41) from the space (38) wherein the drain channel (41) conducts water, steam and dirt to a return hose (4), preferably by vacuum. The running handrail will, by means of the cleaning apparatus, be steam cleaned so as for bacteria to be killed off and dirt dissolved and removed.

17 Claims, 7 Drawing Sheets

(56) References Cited

U.S. PATENT DOCUMENTS

| | | | | |
|---|---|---|---|---|
| 3,946,853 A * | 3/1976 | Ishida | B66B 31/02 | 198/338 |
| 4,934,512 A * | 6/1990 | Lin | B66B 31/02 | 198/338 |
| 4,976,342 A * | 12/1990 | Hwang | B66B 31/00 | 198/495 |
| 5,117,968 A * | 6/1992 | Rivera | B66B 31/02 | 198/338 |
| 6,364,959 B1 * | 4/2002 | Straub | D21F 1/325 | 100/151 |
| 7,134,539 B2 * | 11/2006 | Kim | B66B 31/02 | 198/324 |
| 7,389,866 B2 * | 6/2008 | Kawasaki | B66B 31/02 | 198/335 |
| 7,854,313 B1 * | 12/2010 | Gotsche | B66B 31/02 | 198/495 |
| 2011/0158862 A1 * | 6/2011 | Kim | B66B 31/02 | 422/292 |

FOREIGN PATENT DOCUMENTS

| | | |
|---|---|---|
| KR | 10-2006-0108189 A | 10/2006 |
| WO | WO 2007/021050 A1 | 2/2007 |

\* cited by examiner

ESCALATOR HANDRAIL PURIFIER APPARATUS

INTRODUCTION

The apparatus relates to a cleaner apparatus for a running handrail.

PROBLEM STATEMENT

Handrails or hand-guides of rubber runs along with the escalator, usually on top of a railing. A hand guide for an escalator must run at the same speed as the steps of the escalator. The handrail is usually an endless, i.e. spliced rubber- or synthetic material profile with a C-shape which is threaded onto a T-shaped rail on top of a railing. The handrail must run freely and considering that the person transported must not be harmed, there is good clearance about the handrail and no protruding obstructions for the fingers. The escalator passengers, which they actually are, are requested to hold onto the handrail during the hike upward or downward with the escalator, as a downfall in an escalator may incur considerable personal injury. A problem is the fact that the handrail becomes fat and dirty because all the escalator passengers grip and hold onto it, and it is of little help that most people frequently wash their hands if not everybody do so. However, even clean hands will produce fat and salts from the skin. In order to avoid contagion carrying and spread of dirt with bacteria and vira, particularly in escalators in connection with groceries or clothing shops, it is required to clean the escalator handrail regularly and often. This is usually conducted manually.

BRIEF SUMMARY OF THE INVENTION

The invention is defined in the attached claim 1 and is an escalator handrail cleaning apparatus for a running handrail (1) on a guide rail (11) along an escalator (12), wherein the cleaning apparatus comprises the following features:
- a main body (3) with a preferably underlying, generally through channel (31) for the handrail (1) to pass through,
- a steam supply hose (2) to a longitudinally running inlet channel (21) in the main body (3) and connected to one or more across distribution channels (5) in the main body (3),
- a number of steam nozzles (6) from the distribution channel (5) directed towards the through passing handrail (1),
- at least a first and a second squeegee gasket (7) for delimiting a space (38) in the through channel (31) between the main body (3), the through running handrail (1), and the surroundings and arranged for wiping off water and dirt from the through running handrail (1),
- at least one drain channel (41) from the space (38) wherein the drain channel (41) conducts water, steam and dirt to a return hose (4). The return hose is preferably connected to a suction pump for forming a vacuum in the space (38), and for sucking out the water, the steam, and the dirt.

Preferable features are indicated in the dependent patent claims and in the description below.

ADVANTAGES OF THE INVENTION

The cleaning apparatus of the invention has a series of advantages:
- it allows a quick and efficient cleaning with steam which kills off bacteria on the running handrail. The remaining of the supplied steam after the running handrail has passed out below the last squeegee gasket will be so small, and have a certain amount of heat, that it will quickly evaporate, and that the handrail will appear as rather dry immediately after it being cleaned.
- it allows steam cleaning of the handrail, which is made of rubber or flexible synthetic material, wherein the steam cleaning does not damage the chemical composition of the rubber handrail or washes out the running handrail in the way strong cleaning detergents might otherwise do. Thus the rubber handrail may be much better preserved and may operate for a longer period before having to be replaced.

The cleaning apparatus according to the invention may be mounted in a portable version which is held onto the handrail or which is clamped around the handrail and fixed onto the railing, and that this may be done up in the space wherein the escalator passengers travel. A cleaning apparatus according to the invention may also be mounted "upside-down" in the return space for the handrail, "below the staircase", or in the engine room, and be fixedly mounted or arranged for being moved into and possibly out of engagement with the handrail, and possibly, at given points in time, controlled by a control device, which is not further described here.

EMBODIMENTS OF THE INVENTION

Figures 1, 2:
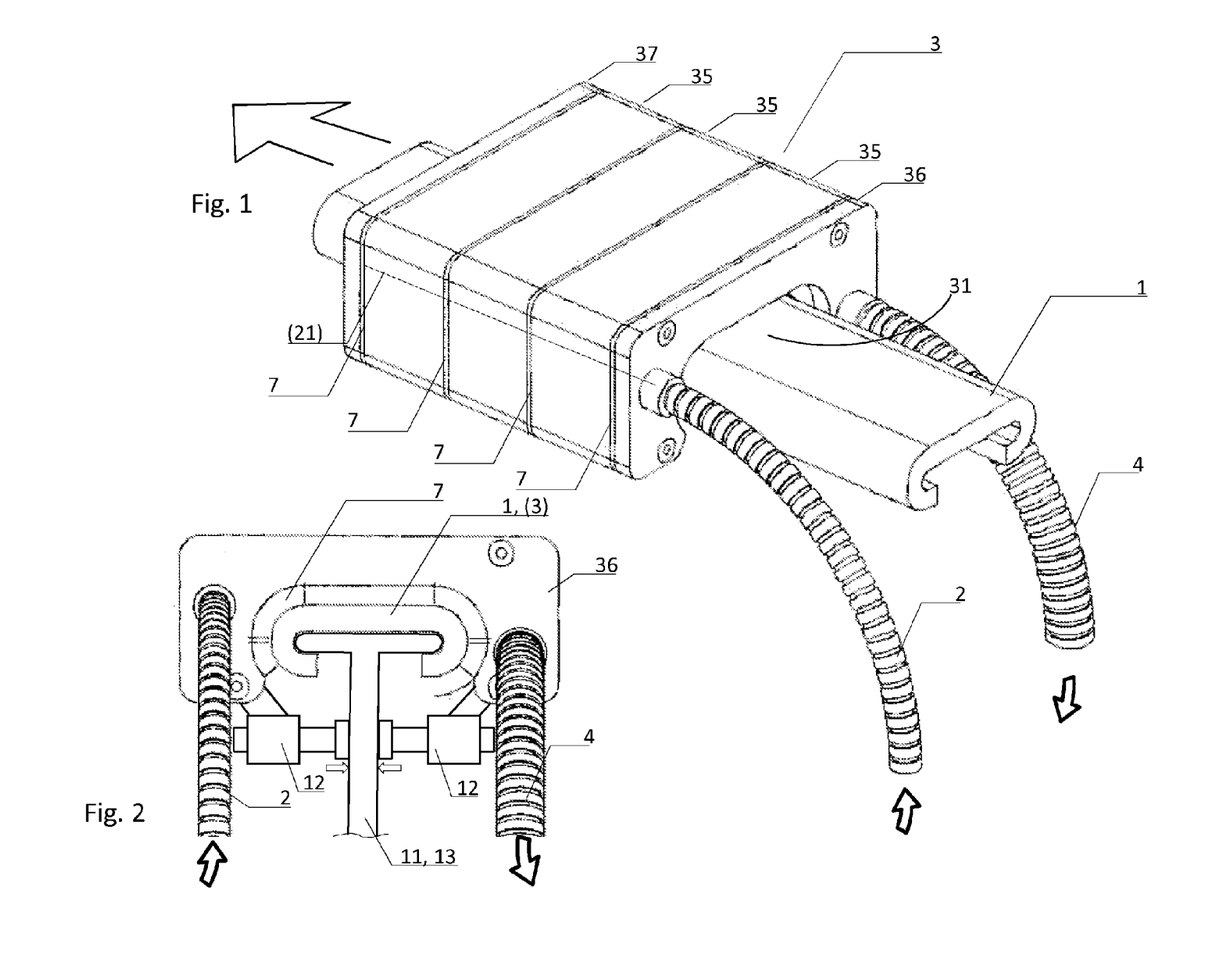
FIG. 1 shows a cleaner apparatus according to the invention, with a main body shown in perspective and bearing against a running handrail and connected to a steam supply hose and a return hose which preferably comprises a suction pump.
FIG. 2 shows the apparatus in end elevation view as seen from the steam supply hose's connecting end, and the running handrail on the railing seen in cross-section, with a connection device so as for the main body to be enabled to be attached to the railing and not being displaced by the friction against the running handrail.
Figure 3:
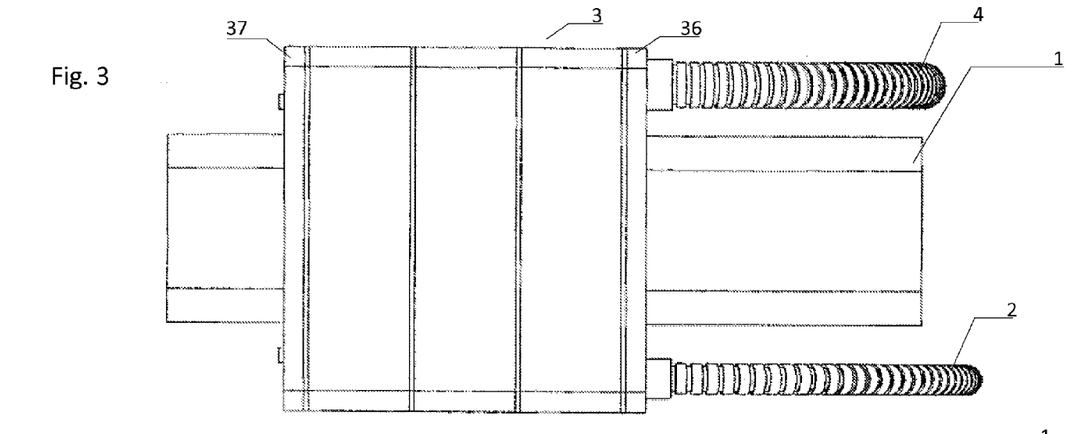
FIG. 3 is a top view of the cleaning apparatus on a section of the running handrail.
Figure 4:
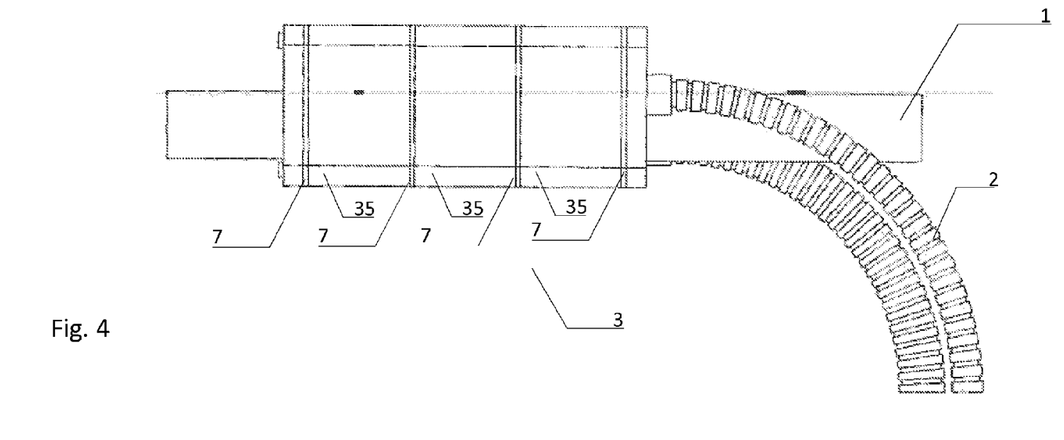
FIG. 4 is a side elevation view of the cleaning apparatus on a section of the handrail, as seen from the side wherein the steam supply hose runs into its connecting end.

The invention is an escalator handrail cleaning apparatus for a running handrail (1), a so-called running handrail, on a guide rail (11) along an escalator (12), please see FIG. 2. The running handrail (1) is usually shaped as a wide, "C"-shaped extruded profile of cured rubber or synthetic material, and having a flat and wide central surface so as for being adapted to an escalator passenger's with of his palm grip. The running handrail is thread onto a "T"-shaped guide rail wherein the stem may be part of a railing, usually an even plate of steel or glass. We do not describe further details of the escalator here nor the motorization of the running handrail (1), as the invention only relates to cleaning of the running handrail (1).

Figure 9:
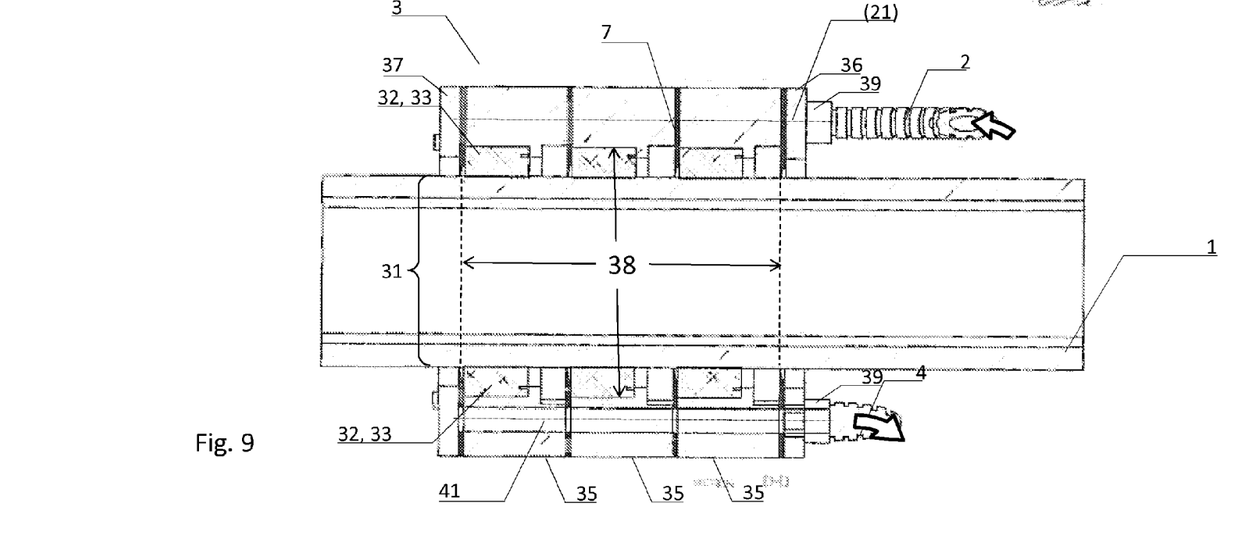
FIG. 9 is a section as seen from below of the main body about a section of the running handrail, and shows gaskets between the sections and also illustrates the space which is delimited by the handrail, the gaskets, and the main body.
Figure 10:
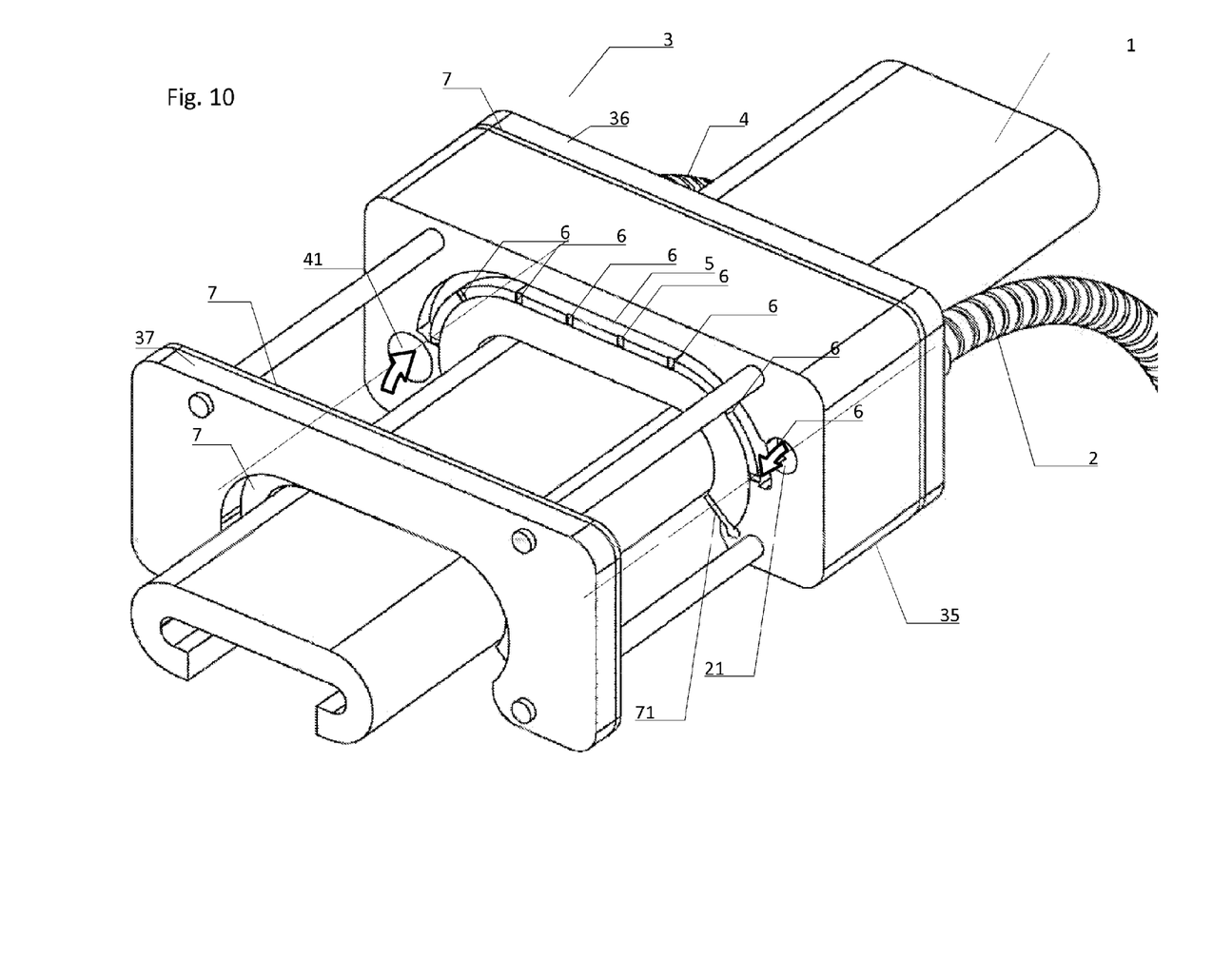
FIG. 10 shows, in perspective, one section and two end plates of the main body arranged on a section of the running handrail. It is shown rods or bolts running through the main body from one end plate to another in order to keep the main body assembled. It is also shown an embodiment of a distribution channel which may be mill-cut into an end of a section, and which is closed by a gasket against a next section. The steam is flushed out through the shown nozzles and towards the running handrail.
Figure 11:
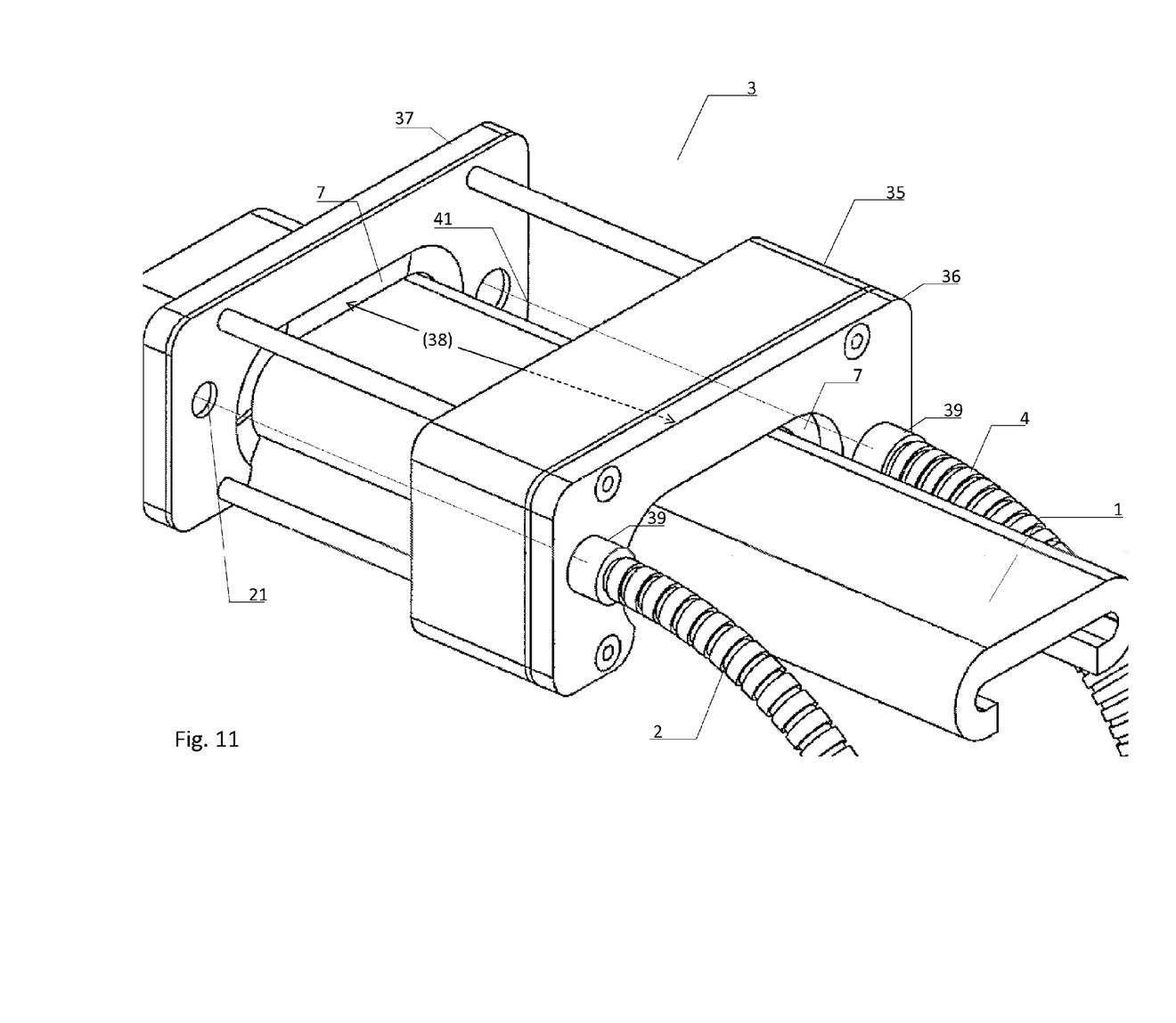
FIG. 11 shows a perspective in another direction relative to FIG. 10.

The cleaning apparatus comprises in its simplest embodiment the following features:
- a main body (3) with a preferably underlying, through channel (31) for the handrail (1) to pass through,
- a steam supply hose (2) to a longitudinally running inlet channel (21) in the main body (3), please see FIG. 10, and connected to one or more across distribution channels (5) in the main body (3);
- a number of steam nozzles (6) from the distribution channel (5) directed towards the through passing handrail (1),
- at least a first and a second squeegee gasket (7) for delimiting a space (38) (please see FIG. 9) in the through channel (31) between the main body (3), the through running handrail (1), and the surroundings, and arranged for wiping off water and dirt from the through running handrail (1), and
- at least one drain channel (41) from the space (38) wherein the drain channel (41) conducts water, steam and dirt to a return hose (4).

The return hose is preferably connected to a suction pump for forming a vacuum in the space (38), and for sucking out the water, the steam, and the dirt.

In an embodiment of the invention the main body is provided with a clamping device (2) for connecting onto the stem (13) of the guide rail (11), please see FIG. 2 which displays a section of the guide rail onto which the clamping device clamps fixedly onto and on both sides thereof. The clamping device may comprise screw chucks, pivot clamps, or pneumatic chucks. Alternatively, the main body may be held manually adjacent to the running handrail.

The steam which is released onto the handrail (1) has a high temperature and cleans it. Also, the running handrail (1) will have so high heat capacity that it will cool the steam so as for it to condensate partly or entirely and forms a certain vacuum in the closed confined space (38) so leakage is to a large degree avoided. In an embodiment of the invention the cleaning apparatus is further provided with a first and a second lateral gasket (71) arranged between the first and the second squeegee gaskets (7) in order to delimit the space (38) in the through channels' (31) lateral direction, wherein the lateral gaskets (71) are arranged to run along opposite sides of the through running handrail. In this way the space (38) is also closed laterally, generally in such way that the lateral gaskets (71) close towards the lateral faces of the running handrail (1) somewhat below the middle of the lateral faces, which are usually of rounded shape. Thus the area of the running rubber handrail is cleaned in the vicinity of comprising (literally) the passenger's thumb, palm and the four remaining fingers.

Steam cleaning alone may not be sufficient to remove dirt which has stuck. In an embodiment of the cleaning apparatus it is further provided with brushes (32) and/or sponges (33) arranged in the space (38) and arranged for running along the through running handrail (1). The shape of sponges (33) or brushes is generally C-shaped and adapted to fit into the U-shape of the cross-section of the inner surface of the main body and the C-shaped surface of the cross-section of the running handrail. Those brushes or sponges rub or scrub off the running handrail (1) and contribute to the dirt being released. The dirt and the water and possibly remaining steam run out via the drain channel (41) and the return hose (4).

Figure 5:
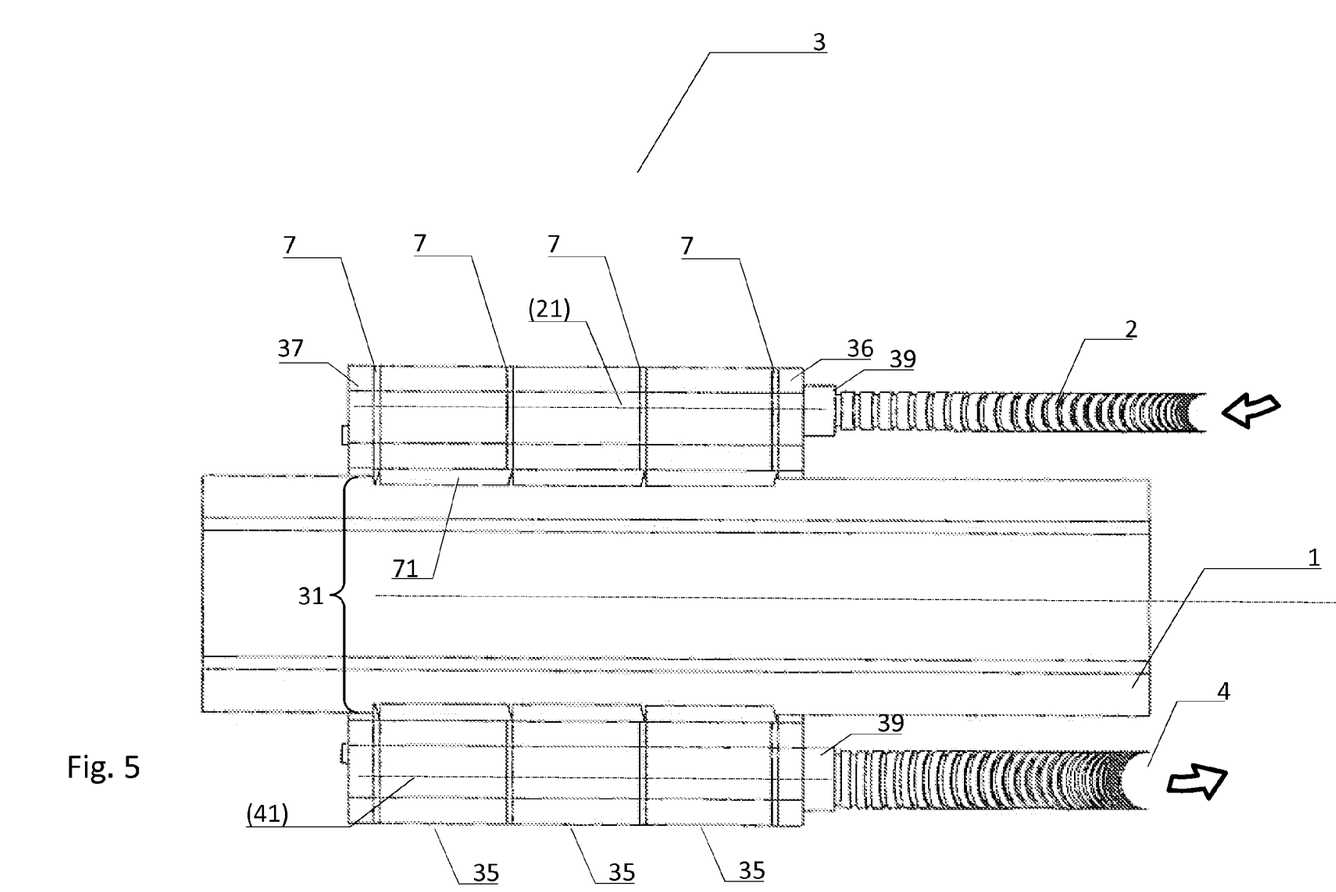
FIG. 5 is a view straight from below, wherein the railing as such is removed but wherein the running handrail is extended through the main channel of the main body, and wherein gaskets slidingly bear against the handrails lower/lateral surface.
Figures 6, 7:
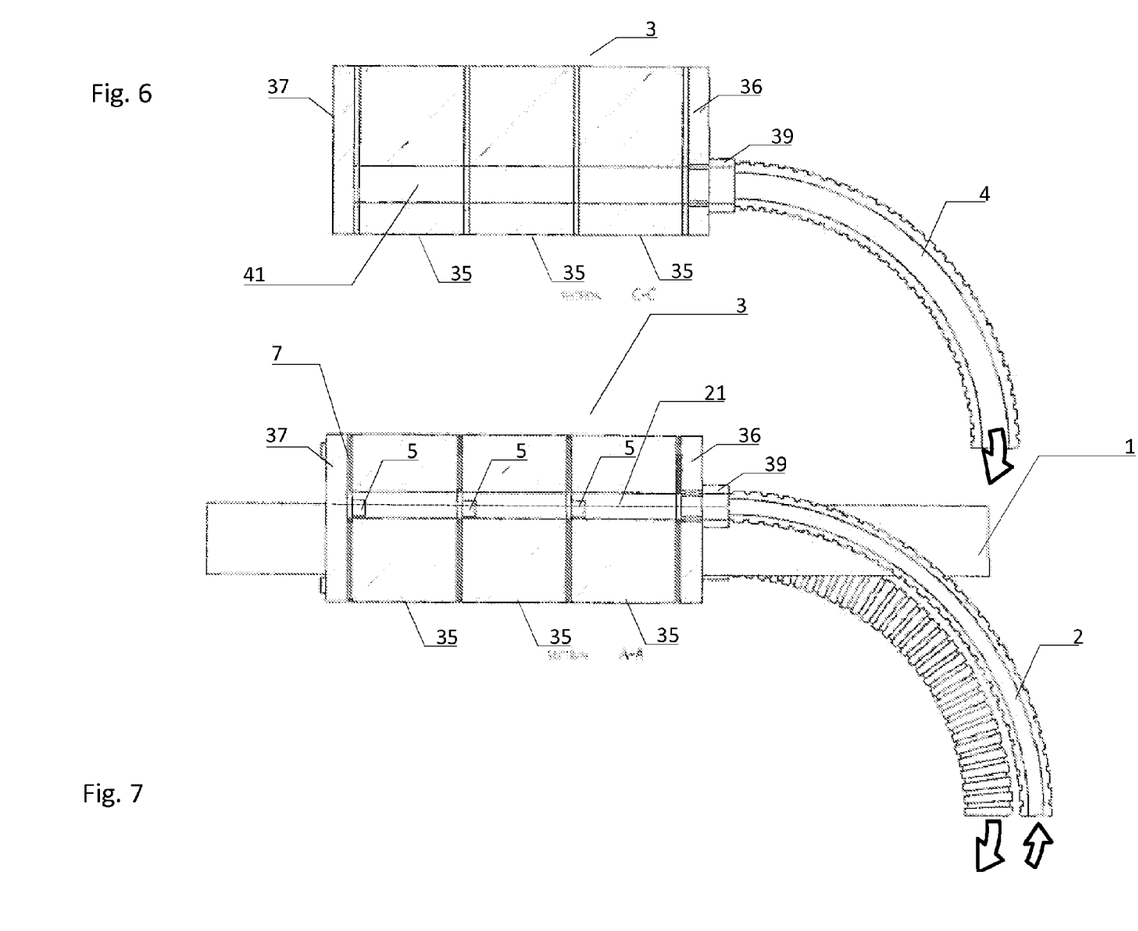
FIG. 6 shows a section parallel with the handrail, wherein the section runs vertically through the outlet channel and the return hose's connector sleeve.
FIG. 7 is a section and partial view, wherein the section is parallel with the section of FIG. 6, but on an opposite side of the running handrail, and cuts through the supply channel and the connector sleeve for the steam supply hose.
Figure 8:
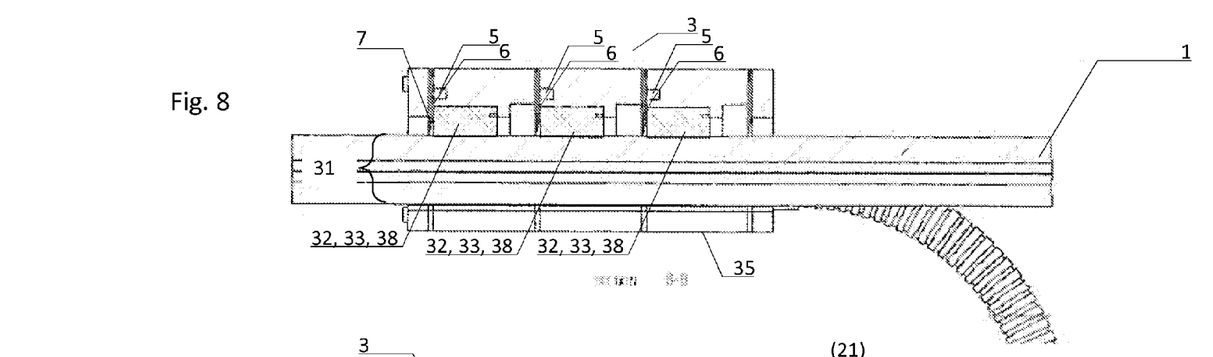
FIG. 8 is a vertical section along the running handrail between the sections of FIGS. 6 and 7 and shows a section through the across distribution channels and their appurtenant nozzles to sponges in the space formed between the railing, the main body, and the gaskets.

It may be difficult to manufacture the apparatus in one single piece, and it may also rather not be desirable to do so. The cleaning apparatus according to the description above may have its main body (3) subdivided into equal, U-shaped athwart sections (35) wherein the distribution channel (5) is formed as a groove in an end of each section (35). Each section may then be cut out from a thick plate. In an embodiment the squeegee gaskets (7) not only be arranged within the channel but also comprise a large portion with the same circumference as the sections' (35) cross-section so as for proofing between the sections (35), please see FIGS. 1 and 5, e.g. We write above that the main body (3) and the sections (35) to have a U-shape. This applies to that part of the main body and possibly the sections which form the through channel (31) which envelopes and engage the running handrail (1). The external shape of the main body otherwise is in the shown embodiment a generally chamfered, rectangular block, its external shape being less important and may be shaped in a way appropriate to an industrial designer in order to consider practical for manual usage or for installing it on a mechanical arm.

A first and a second U-shaped end plate (36, 37) are in an embodiment arranged ahead of the first, and after the trailing U-shaped sections (35), respectively, please see FIGS. 1, 3, 10, and 11.

The cleaning apparatus is preferably arranged in such a way as to the first end plate (36) is provided with connection sleeves (39) the steam supply hose (2) and the return hose (4).

It is of course a practical feature that the steam generator itself is free from the cleaning apparatus in order to reduce the weight. In a practical embodiment the steam supply hose (2) in its opposite end connected to a steam source, and wherein the return hose (4) is connected to an outlet or collector tank, preferably wherein the steam source and the collector tank are in one common unit. To make such a steam source is a simple task to the person skilled in the art and needs not to be described here, nor does a collector tank. It may be required to have a suction pump connected to the return hose (4) so as for water with dirt and possibly remaining steam to be sucked out via the drain channel (41), i.e. that it is maintained a vacuum between the main body (3) and the running handrail (1). A prerequisite for the suction pump is that it must be capable of removing for the amount of steam whereof much has condensed during the cleaning process in the space (38) between the main body, the gaskets (7, 71) and the running handrail, so as no overpressure is formed. Some amount of water will always be carried along as humidity on the surface of the consecutively cleaned handrail as it emerges under the latter squeegee gasket (7). Experiments have shown that very small amounts of water are required to efficiently cleanse a running escalator, in some cases only a few deciliters. To a large degree the steam pressure from the nozzles (6) will push dirt out from brushes or sponges so as for the main body to a large degree will clean itself during use.

However it will possibly be required to clean the main body (3) and particularly brushes (32) and/or sponges (33) and squeegee gaskets (7) and lateral gaskets (71) arranged in the space (38). The main body may be cleaned manually using a brush. Worn sponges (33) or brushes (32) may be replaced by new ones. Self-provided steam will push out dirt from brushes or sponges.

The invention claimed is:

1. An escalator handrail cleaning apparatus for a running handrail on a guide rail along an escalator, wherein the cleaning apparatus comprises the following features:
   a main body with an underlying, generally through channel for the handrail to pass through,
   a steam supply hose to a longitudinally running inlet channel in the main body and connected to one or more across distribution channels in the main body,
   a number of steam nozzles from the distribution channel directed towards the through passing handrail,
   at least a first and a second squeegee gasket for delimiting a space in the through channel between the main body, the through running handrail, and the surroundings and arranged for wiping off water and dirt from the through running handrail,
   at least one drain channel from the space wherein the drain channel conducts water, steam and dirt to a return hose, and
   a first and a second lateral gasket arranged between the first and the second squeegee gaskets for delimiting the space in the through channel laterally,
   wherein the lateral gaskets are arranged to run along opposite lateral faces of the through running handrail.

2. The cleaning apparatus according to claim 1, wherein the main body is provided with a clamp for direct or indirect connection to a stem of the guide rail.

3. The cleaning apparatus according to claim 1, wherein the steam supply hose in its opposite end is connected to a steam source, and wherein the return hose is connected to an outlet or collector tank, wherein the steam source and the collector tank are in one common unit.

4. The cleaning apparatus according to claim 1, wherein a suction pump is connected to the return hose such that water with dirt and any remaining steam is sucked out via the drain channel and the return hose and that a vacuum is maintained between the main body and the running handrail.

5. The cleaning apparatus according to claim 1, wherein the main body is mounted on an arm arranged to move the cleaning apparatus into or out of engagement with the running handrail.

6. The cleaning apparatus of claim 5, wherein the first end plate is provided with connector sleeves for the steam supply hose and the return hose.

7. The cleaning apparatus according to claim 1, further provided with brushes arranged in the space and arranged for running against the through running handrail.

8. The cleaning apparatus according to claim 7, wherein said main body is subdivided into generally equal, U-shaped athwart sections wherein said distribution channel is formed as a groove in one end of each section.

9. The cleaning apparatus of claim 7, wherein the first end plate is provided with connector sleeves for the steam supply hose and the return hose.

10. The cleaning apparatus according to claim 1, further provided with sponges arranged in the space and arranged for running against the through running handrail.

11. The cleaning apparatus according to claim 10, wherein said main body is subdivided into generally equal, U-shaped athwart sections wherein said distribution channel is formed as a groove in one end of each section.

12. The cleaning apparatus according to claim 1, wherein said main body is subdivided into generally equal, U-shaped athwart sections wherein said distribution channel is formed as a groove in one end of each section.

13. The cleaning apparatus according to claim 12, wherein said squeegee gaskets are arranged for sealing between said sections.

14. The cleaning apparatus according to claim 13, wherein a first and a second U-shaped end plate are arranged ahead of a first and behind a last of said U-shaped sections, respectively.

15. The cleaning apparatus according to claim 12, wherein a first and a second U-shaped end plate are arranged ahead of a first and behind a last of said U-shaped sections, respectively.

16. The cleaning apparatus of claim 15, wherein the first end plate is provided with connector sleeves for the steam supply hose and the return hose.

17. An escalator handrail cleaning apparatus for a running handrail on a guide rail along an escalator, wherein the cleaning apparatus comprises the following features:
   a main body with an underlying, generally through channel for the handrail to pass through,
   a steam supply hose to a longitudinally running inlet channel in the main body and connected to one or more across distribution channels in the main body,
   a number of steam nozzles from the distribution channel directed towards the through passing handrail,
   at least a first and a second squeegee gasket for delimiting a space in the through channel between the main body, the through running handrail, and the surroundings and arranged for wiping off water and dirt from the through running handrail, and
   at least one drain channel from the space wherein the drain channel conducts water, steam and dirt to a return hose,
   wherein the main body is mounted on an arm arranged to move the cleaning apparatus into or out of engagement with the running handrail.

* * * * *